United States Patent Office 3,197,014
Patented July 27, 1965

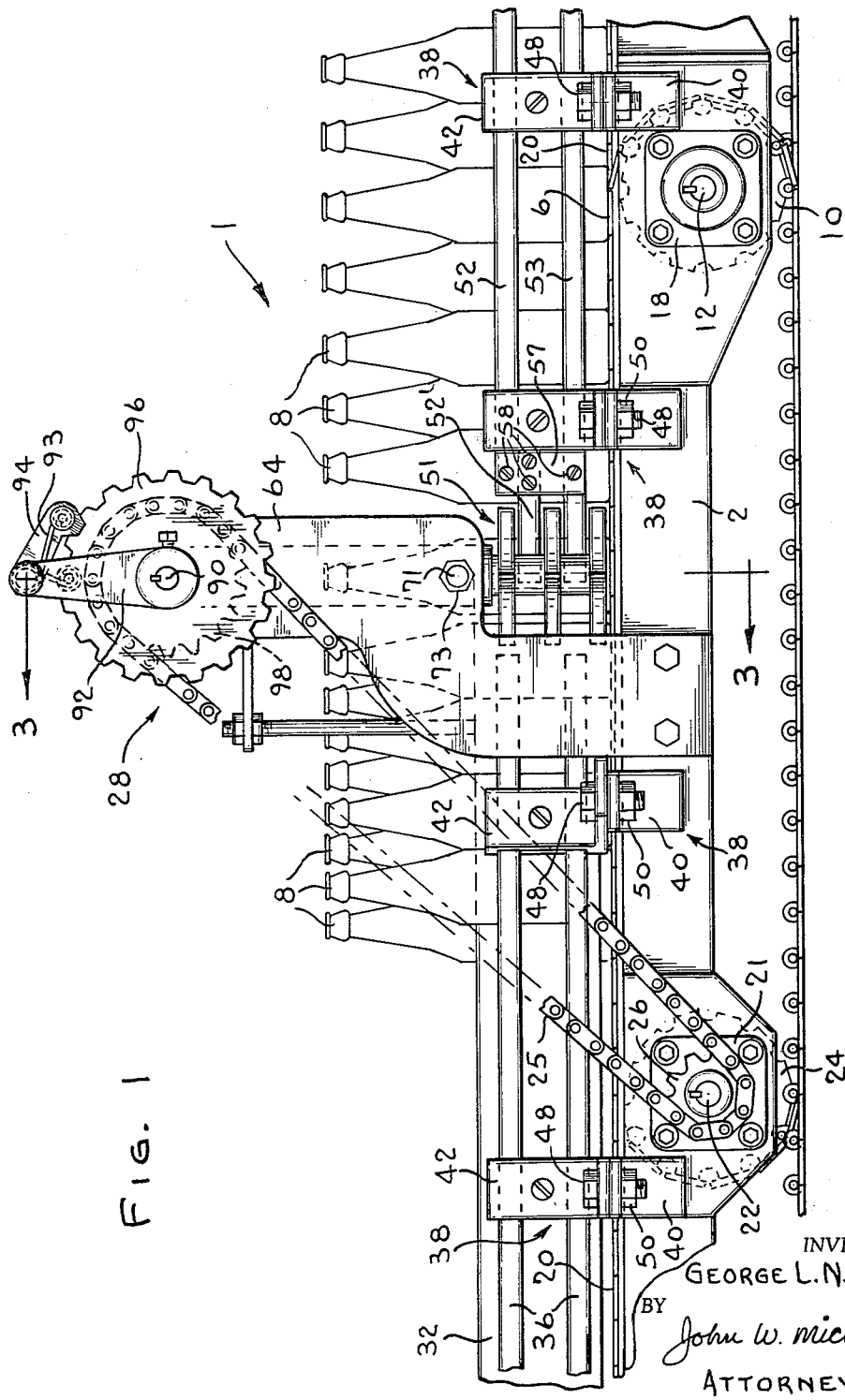

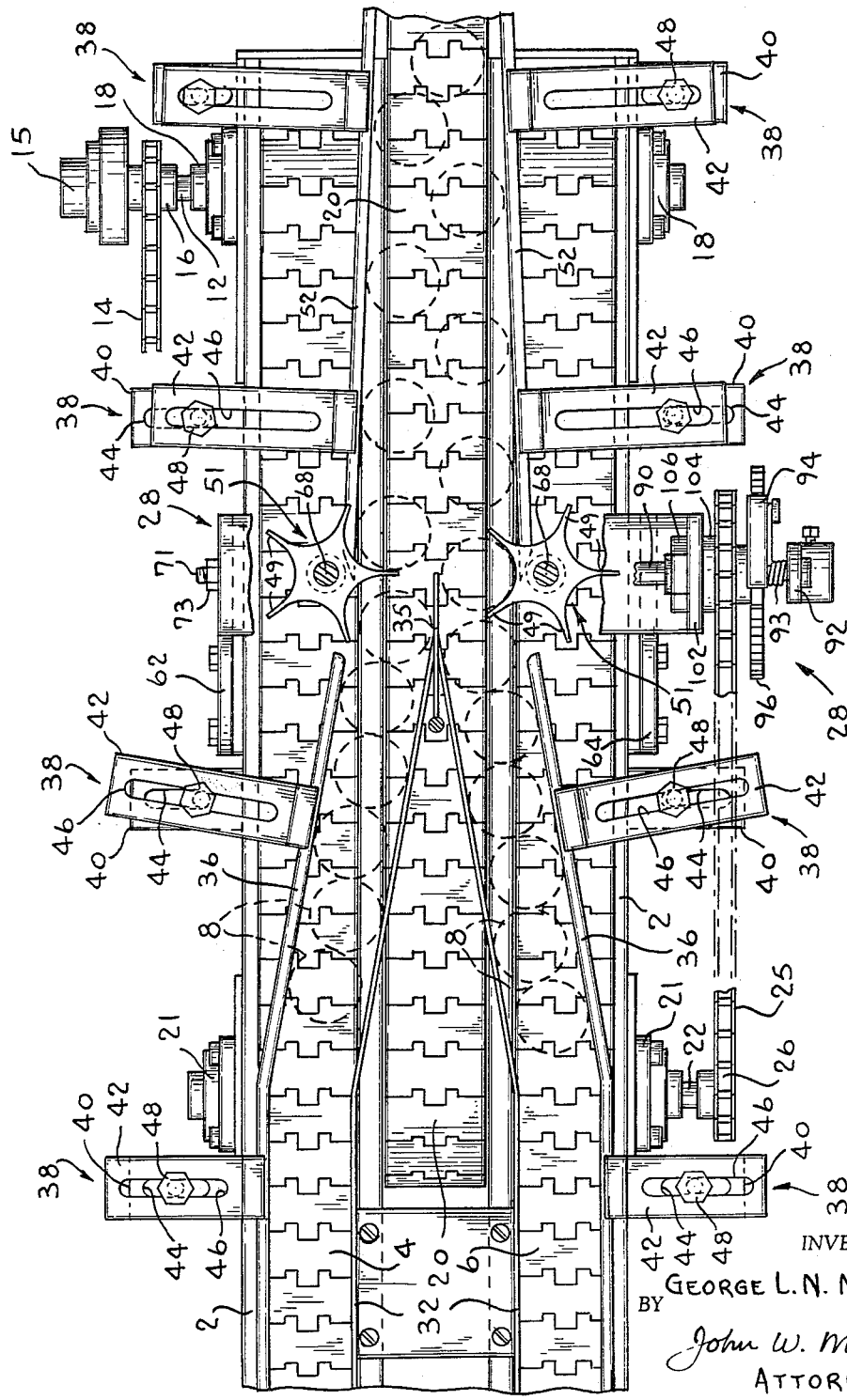

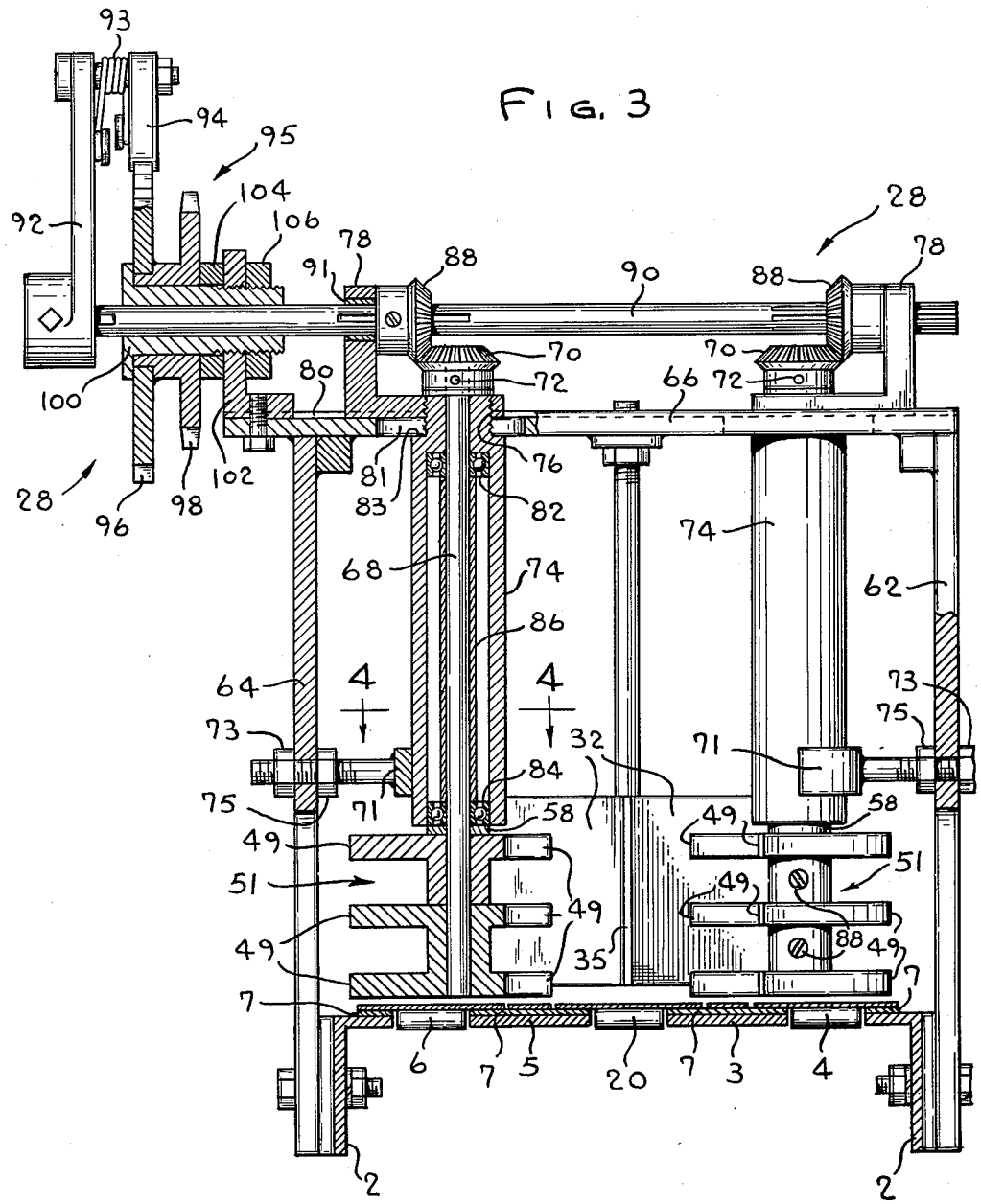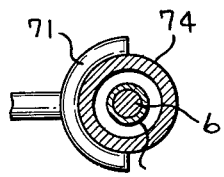

3,197,014
ARTICLE HANDLING APPARATUS
George L. N. Meyer, Milwaukee, Wis., assignor to Geo. J. Meyer Manufacturing Co., Cudahy, Wis., a corporation of Wisconsin
Filed Mar. 14, 1963, Ser. No. 265,101
9 Claims. (Cl. 198—32)

This invention relates to an article handling apparatus, and in particular, to a device for moving containers in an upright position on a plurality of conveyors, and transferring the said containers onto a single conveyor in single line fashion by starwheel combining means.

The apparatus described herein is intended for use with high speed machinery commonly used in bottling plants. It is understood, however, that the invention is applicable for use with other types of machinery wherein the transferring of articles is necessitated.

The transferring and combining of containers from a plurality of conveyors is required in numerous bottling plant applications because of the capacity of certain equipment. It is often necessary to utilize two machines having a low output capacity to supply a single machine having a high output capacity. For example, two bottle washers having a low capacity are often used to supply bottles to a filling machine so that the latter might be operated at its maximum capacity.

Since present day bottling equipment is designed for high output, it will be appreciated that any article handling or transferring apparatus which combines containers from a plurality of conveyors will necessitate a structure of dependability and one which is capable of high speed operation with a minimum of container jamming and upsetting.

Heretofore the combining of containers supplied from a plurality of conveyors has been accomplished by dials advancing screws or starwheels which are driven and which positively advance the containers at a constant rate and position them onto a single conveyor. This positive transfer of the containers being combined by an external driving means creates undesirable aspects of container jamming.

To accomplish the objects of this invention, an article handling apparatus is disclosed herein which has a free-wheeling container combiner means that is actuated by the supply of containers delivered thereto. Further, a limiting means comprising a ratchet assembly allows only a predetermined maximum amount of containers to be combined.

It is the general object, therefore, of the present invention to provide a device for combining containers supplied from a plurality of conveyors, onto a single conveyor.

It is a further object to provide a combiner wherein the means to combine containers into a single line is freewheeling whereby the supply of oncoming containers to the combiner actuates the same.

It is a further object to provide a combiner which, although being freewheeling, limits the amount of containers passing therethrough.

It is a further object to provide a combiner wherein the maximum quantity of containers permitted to pass therethrough is determined by the speed of a single output conveyor.

It is a further object to provide a combiner mechanism which is readily adjustable to accommodate a wide range of bottle diameters without any interchange of parts.

A further object is to provide an improved combiner which is capable of smoothly and efficiently transferring containers from a plurality of conveyors onto a single conveyor with a minimum of marring and jamming of the containers.

In addition to the above mentioned objects, other objects will be pointed out in or be apparent from the following specification and claims which, when taken in conjunction with the accompanying drawings, illustrate a preferred embodiment of the invention.

In the drawings:

FIG. 1 is a side elevation view of the bottle combiner of this invention;

FIG. 2 is a top elevation view of FIG. 1 with certain parts broken away;

FIG. 3 is a cross sectional view taken along lines 3—3 of FIG. 1; and

FIG. 4 is a sectional view taken along lines 4—4 of FIG. 3.

Referring to the drawings and particularly to FIGS. 1 and 2, the combiner apparatus 1 of this invention comprises a stationary frame member 2 which supports the combiner. A pair of endless chain, plate-type, infeed conveyors 4 and 6, which are substantially parallel to each other, are adapted to transfer a supply of containers such as bottles 8 in an upright position in the direction shown. The conveyors 4 and 6 are supported and guided on the frame member 2 in a conventional manner. Center strips 3 and 5 are supported relative to the frame 2 by conventional support means (not shown). The conveyors 4 and 6 pass over sprockets 10—10, respectively, at the discharge end of combiner 1. With reference to FIG. 1, it is understood that only one of the sprockets 10—10 can be seen and that the other one, which drives conveyor 4, is immediately behind the sprocket shown in this figure. The sprockets 10—10 are keyed to shaft 12 which is driven by an independent drive means (not shown) through a wood block friction clutch 15 interposed between shaft 12 and drive sprocket 16, the latter of which is driven by chain 14. Normally, the two infeed conveyors would be driven by the respective machine with which they are associated, such as a washer. In the event of a bottle block or jam on either conveyor 4 or 6, the clutch 15 will slip thereby stopping the flow of power to shaft 12. Journal means 18—18 mounted in frame member 2, as shown, rotatively support shaft 12.

Discharge conveyor 20, also mounted on frame 2, is located intermediate infeed conveyors 4 and 6, and is adapted to receive containers alternately from the said infeed conveyors. Stainless steel wear plates 7 are interposed between conveyors 4, 6 and 20 and frame 2, as clearly shown in FIG. 3.

Discharge conveyor 20 is driven by a drive means (not shown) at its termination point remote from the discharge end of the conveyor. Normally, the discharge conveyor 20 is driven by the apparatus to which it is delivering containers such as a filler. Since conveyor 20 is receiving its supply of containers from both infeed conveyors 4 and 6, it is apparent that the lineal speed of conveyor 20 must be approximately twice the lineal speed of conveyors 4 and 6 in order to accommodate all of the containers supplied from the infeed conveyors.

Shaft 22, located at the infeed end of the combiner 1, has sprocket 24 keyed thereto at an intermediate position and is driven by conveyor 20. Shaft 22, in turn, drives sprocket 26 which "drives" the combiner means 28, to be hereinafter described. Journal means 21—21, mounted in frame 2, rotatively supports shaft 22, as shown.

With reference to FIG. 2, as containers 8 are transferred on infeed conveyors 4 and 6 to the combiner means 28, they are guided by guide means comprising stationary center guides 32—32 which are in parallel relationship to the inner portions of the infeed conveyors and guide rails 36—36 which guide the containers along the outer portions of conveyors 4 and 6. The center guides 32—32 converge to a point which is intermediate the output conveyor 20. A strip 35 of flexible plastic is inserted between the two rails 36—36 at their convergence point and extends to a centerline drawn between the axes of the starwheels 51 equidistant from such axes. The guide rails 36—36 are held in place by adjustable bracket supporting means 38, each of which is comprised of a pair of L-shaped angle brackets 40, 42 having aligned slots 44-46, respectively, note FIGS. 1 and 2. Brackets 40 are stationary and are fastened to frame 2 by welding or any other suitable means. Brackets 42 are attached to guide rails 36—36 and are adjustably secured to brackets 40 by conventional bolt and nut fastener 48, 50, respectively. It can be seen that slots 44 and 46 of brackets 40 and 42, respectively, being in alignment with one another, permit bracket 42 to be adjusted relative to stationary bracket 40 to thereby vary the distance between guide rails 36—36 and center guide 32—32 at the entrance point of bottles into the combiner means 28. This adjustable bracket supporting means 38 is necessary in order that various diameter bottles may be combined effectively.

Upper and lower guide means 52, 53, respectively, guide containers 8 along the output conveyor 20. Adjustment of guide means 52, 53 is permitted by adjustable bracket supporting means 38, which are similar to those described supra.

In order to establish guiding of the containers immediately upon their departure from starwheels 51, lower guide means 53 extends to a point intermediate the top and middle sets of aligned points 49 of starwheels 51—51. Since upper guide means 52 are in horizontal alignment with the lower set of points 49 of starwheels 51—51 an offset extension 52' is attached to guide means 52 so that the guide may be extended to a point intermediate the middle and bottom sets of aligned points 49, as clearly shown in FIG. 1. Extension 52' is held in place by extension bracket 57 which is attached to guide means 52, 53 by screws 58, also shown in FIG. 1.

With reference to FIGS. 1 and 3, combiner means 28 includes the following.

Bridge means comprising leg members 62 and 64 and top member 66 support combiner means 28. Each starwheel 51 is mounted on a drive spindle 68 having a bevel gear 70 secured thereto by pin 72. Outer sleeve 74 has a reduced end portion with threads 76 thereon which extends through slots 81 in top support member 66 and is threadedly engaged in a bracket 78. Brackets 78 are slidably mounted in channel 80 located on top support member 66. It can be seen that bracket 78 and outer sleeve 74 may be tightened relative to stationary top member 66 by engaging the threaded portion of sleeve 74 into bracket 78 until the shoulder portion 83 of the said sleeve firmly abuts the bottom portion of member 66. The drive spindles 68 are made adjustable to each other to adapt the combiner to accommodate containers of various diameter.

Upper and lower ball bearing members 82 and 84, respectively, are pressed into sleeve 74. Inner sleeve 86 maintains separation between bearing members 82 and 84, which journal drive spindle 68. A five point starwheel 51 having three sets of aligned points 49 forming bottle receivers pockets 54 therebetween, is attached to spindle 68 by set screw means 88. The starwheel 51 may be a unitary structure or may be of two parts, as shown in the cross sectioned portion of FIG. 3.

With reference to FIGS. 3 and 4, adjusting forks 71 having locking means 73, 75 prevent starwheels 51 from outward vertical displacement. This form of stop means is necessary since during normal operation the combining of containers exerts an outward force which must be counteracted. Spacers 58 are inserted between sleeves 74 and starwheels 51, as shown in FIG. 3.

Bevel gears 70 on spindles 68 are enmeshed with similar bevel gears 88. Spline arrangements between gears 88 and central shaft 90, as shown in FIG. 3, permit the adjustment of brackets 78 and bevel gears 88 relative to each other. Central shaft 90 is journaled in bushings 91 in brackets 78.

Shaft 90 extends beyond leg member 64 and has an arm 92 keyed thereto, as shown in FIG. 1. Pawl member 94 is mounted on arm 92 and is urged into engagement by spring 93 with ratchet member or wheel 96 which is affixed to a sprocket wheel or speed limiting member 98, both of which are freely rotatable on bushing 100. The said arm 92, pawl 94, ratchet 96, and sprocket wheel 98 comprise limiting means 95. Bushing 100 is threaded at one end and is supported on bracket 102 by locking means 104 and 106, as clearly shown in FIG. 3. The bracket is secured to top member 66 as shown. Thus, arm 92 and gears 88—88 are all fixed to common shaft 90 and rotate therewith, whereas ratchet member 96 and sprocket wheel 98 are freely rotatable on bushing 100. Thus, arm 92, pawl 94 and wheel 96 provide a unidirectional connection between the sprocket wheel 98 and shaft 90.

*Operation*

The operation of the combiner apparatus heretofore disclosed is as follows:

The guide rails 36—36, forks 71 and starwheels 51 must be properly adjusted to obtain maximum results. The adjustments are made to accommodate the particular diameter of containers which are to be combined. Guide rails 36—36 are adjusted so that there is approximately ¼" total clearance between the containers and the guide rails. The starwheels 51 are then positioned so that the inner portion of the guide rails 36—36, if extended into the starwheels 51, would not extend beyond the surface of the recessed portions or pockets of the starwheels 51. Subsequent to the adjustment of the starwheels 51 the forks 71 are adjusted so that the spindles 68 are vertical. Guide means 52, 52' and 53 are then adjusted by adjustable bracket supporting means 38 so that the said guide means are adjacent to the inner diameter of the starwheels 51, shown by the dotted lines on the said starwheels in FIG. 2.

Oncoming containers 8 are delivered to the starwheels 51 on the two infeed conveyors 4 and 6, which are moving in the direction shown in FIG. 2. The receiving pockets 54 of starwheels 51 are so positioned relative to each other that containers 8 will be placed on discharge conveyor 20 alternately from the two infeed conveyors 4 and 6. It is noted that the containers 8 actuate the starwheels 51 as they are delivered thereto and the starwheels alternately allow containers 8 to be placed from conveyors 4 and 6 onto conveyor 20 in single line fashion.

With reference to FIG. 3, as the starwheels 51 are rotated by oncoming containers, they rotate gears 70 which in turn rotate gears 88, shaft 90, and arm 92, all of which are fixed to their respective shafts. The points 49 of starwheels 51 will always maintain their phased relationship since one starwheel cannot turn without turning the other.

Pawl 94 is urged into engagement with ratchet member 96 by spring 93. Ratchet member 96 is connected to sprocket wheel 98, both of which are freely rotatable on bushing 100. Hence, ratchet member 96 and sprocket wheel 98 rotate in a clockwise direction together and are constantly driven in synchronism with conveyor 20 by means of sprocket 26 and interconnecting chain 25, as heretofore mentioned. The speed of the discharge conveyor 20 may be adjusted by any conventional means, not shown. The regulation of this conveyor also regulates the speed of rotation of member 96 and wheel 98. It can be seen that when the driven rotational speed of member 96 and wheel 98 is *greater* than the rotational speed of shaft 90 and arm 92, the latter speed being determined by the quantity of containers actuating the starwheels 51, the pawl 94, being unidirectional, will be urged upwardly out of engagement with ratchet 96. Hence, the constant rotation of the ratchet 96 and sprocket 98 will have no effect on "freewheeling" arm 92, shaft 90, gears 88 and starwheel assemblies 34 under normal operating conditions. However, when shaft 90 attempts to rotate *faster* than the driven rotational speed of ratchet 96 and sprocket 98, pawl 94 *engages* ratchet 96 to form a driving connection and hence *limits* the rotation of shaft 90, gears 88 and starwheels 51 since the arm 92 and shaft 90 will be unable to rotate faster than the driven ratchet 96 and sprocket 98. Thus, only a maximum predetermined quantity of containers are permitted to pass through the starwheels 51 due to this limiting action of the unidirectional pawl 94, ratchet 96 and sprocket 98.

Hence, the pawl 94, ratchet 96, sprocket 98, shaft 90, gears 88 and starwheels 51 are arranged in such a manner as to provide a "freewheeling" combiner means which is container actuated and also provides a "limiting" means to effectively control the maximum quantity of containers desired to be combined.

Although but one embodiment of the present invention has been illustrated and described, it will be apparent to those skilled in the art that various changes and modifications may be made therein without departing from the spirit of the invention or from the scope of the appended claims.

I claim:
1. A device for transferring containers in an upright position from separate conveyors onto a single conveyor including:
   a pair of infeed conveyors providing a supply of oncoming containers;
   a discharge conveyor intermediate said infeed conveyors;
   separate means to drive said conveyors;
   container actuated combiner means including a pair of container actuated starwheel assemblies, one positioned on each side of said discharge conveyor, means connecting said assemblies in phased relationship, said assemblies adapted to be actuated by oncoming containers and to transfer the same alternately from said infeed conveyors onto said discharge conveyor; and
   limiting means modulated by said discharge conveyor, said limiting means allowing only a maximum predetermined quantity of containers to be transferred to said discharge conveyor.

2. A device according to claim 1 wherein said limiting means includes an arm member fixed to said shaft, a unidirectional pawl mounted on said arm member, a ratchet member rotatively mounted on said shaft, a sprocket member rotatably mounted on said shaft and fixed to said ratchet member for rotation therewith, means operatively connecting said sprocket member with said discharge conveyor to form a driving connection when said shaft attempts to rotate as fast as or faster than said sprocket to thereby limit the speed of said shaft.

3. Article combining apparatus for transferring articles carried on a pair of infeed conveyors to a single discharge conveyor comprising:
   combiner means for alternately transferring articles from the infeed conveyors to the discharge conveyor, said combiner means including a pair of rotating members which are rotated by the articles as they are transferred from the infeed to the discharge conveyor; and
   speed limiting means for limiting the speed at which said rotating members can be rotated by articles transferred thereby.

4. Article combining apparatus according to claim 3 which said rotating members are starwheels geared to each other in phased relationship.

5. Article combining apparatus according to claim 3 in which said speed limiting means includes a speed limiting member, means for rotating said speed limiting member at a constant speed, and a unidirectional connection means between said container actuated rotating members and said speed limiting member so that said rotating members can be driven by the articles at speeds equal to or less than the speed of said speed limiting member but cannot be driven at speeds in excess of the speed of said speed limiting member.

6. Article combining apparatus according to claim 5 in which said unidirectional connection means includes a ratchet arm and pawl operatively connected to said container actuated rotating members and a ratchet wheel operatively connected to said speed limiting member, said ratchet wheel adapted for rotational engagement with said pawl.

7. Article combining means according to claim 6 in which said means for rotating said speed limiting member includes a driving connection between said discharge conveyor and said speed limiting member.

8. Article handling apparatus for transferring articles between a first pair of conveyors and a second single conveyor comprising:
   transfer means for alternatiely transferring articles between said first pair of conveyors and said second single conveyor, said transfer means including a pair of rotating members which are rotated by the articles as they are transferred between said first pair of conveyors and said second single conveyor; and
   speed limiting means for limiting the speed at which said rotating members can be rotated by articles transferred thereby.

9. Article handling apparatus according to claim 8 in which said speed limiting means includes a speed limiting member, means for rotating said speed limiting member at a constant speed, and a unidirectional connection means between said container actuated rotating members and said speed limiting member so that said rotating members can be driven by the articles at speeds equal to or less than the speed of said speed limiting member but cannot be driven at speeds in excess of the speed of said speed limiting member.

References Cited by the Examiner

UNITED STATES PATENTS 2,404,232    7/46    Hunter _____ 198—32 X

SAMUEL F. COLEMAN, *Primary Examiner.*

EDWARD A. SROKA, *Examiner.*